C. M. LUFKIN & C. G. ALLEN.
Horse Hay-Rakes.
No. 142,031.  Patented August 19, 1873.
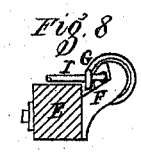
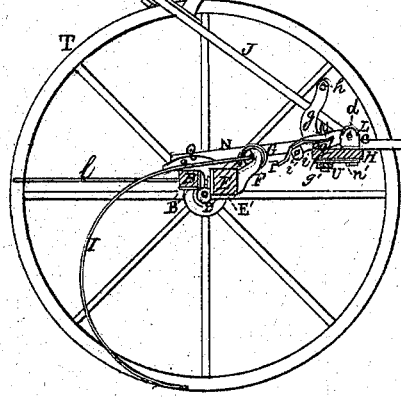
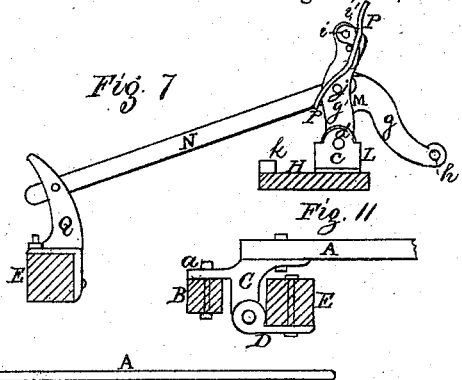
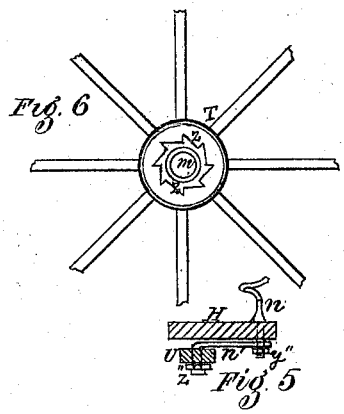
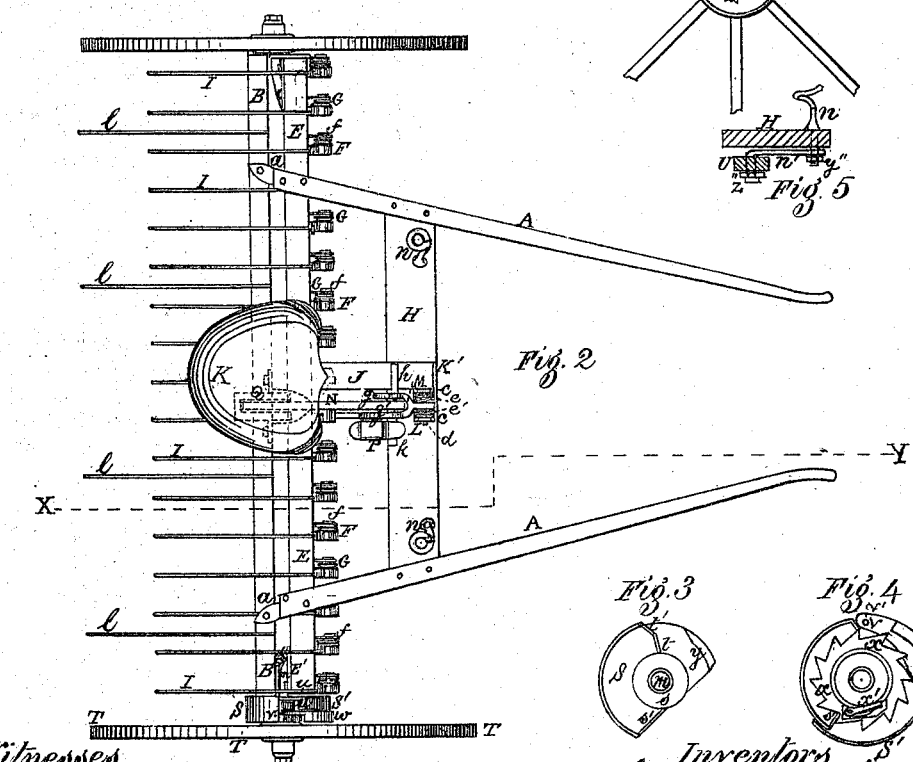
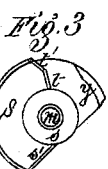
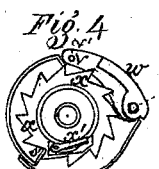

UNITED STATES PATENT OFFICE.

CHARLES M. LUFKIN AND CHARLES G. ALLEN, OF BARRE, MASSACHUSETTS.

IMPROVEMENT IN HORSE HAY-RAKES.

Specification forming part of Letters Patent No. 142,031, dated August 19, 1873; application filed May 26, 1873.

*To all whom it may concern:*

Be it known that we, CHARLES M. LUFKIN and CHARLES G. ALLEN, both of Barre, in the county of Worcester and State of Massachusetts, have invented certain Improvements in Horse-Rakes, of which the following is a specification:

Figure 1 of the accompanying drawings is a vertical longitudinal section taken in line X Y, and Fig. 2 is a top view of our improved horse-rake. Figs. 3, 4, 5, 6, 7, 8, 9, 10, 11 are parts in detail of the same.

The present invention relates to certain new and useful improvements in horse-rakes, having for their principal objects the production of an economically-constructed rake, that is effectively operated, so as to dump and return the rake to its original position, by the foot of the driver, who is thus allowed the use of both hands for driving, &c.; the furnishing of a ready means of adjustment and release of the teeth; also, the perfecting of the arrangement and operation of several minor devices, by which the rake is readily and advantageously operated. Our improvements consist, mainly, of a horse-rake arranged and operated, as will be hereinafter more fully explained, so that the pressure of the driver's foot on a peculiarly-constructed lever-treadle shall operate a series of mechanical devices, to be duly explained, that, with the recoil of the teeth and "hold-down" springs, together with the resistance of the hay, &c., to the draft of the horse, dump and replace the rake, which is held in working position, or is raised by the action of the driver's foot on a stirrup arranged and operated as will be duly described. These improvements also consist in the shield or shields connected with the head and bar of the rake, and arranged with a beveled or inclined ledge and inclined plane or segmental flange to receive and direct a roller of a pawl when thrown in and out of gear with a ratchet-wheel by the action of the rake-head and by its own weight, as will be hereinafter explained, and of so arranging and operating the ratchet-wheel as to prevent its turning on the hub when the rake is dumped by the horse, and allow of its turning on the hub when the operator dumps the rake or raises it for backing or other purposes. Our improvements consist, further, in forming, as will be explained in due course, the hold-down springs, so as to allow of the ready adjustment or release of the teeth in and from the spring stems or bearings. Finally, our improvements consist in the arrangement and operation of several minor mechanical devices, that will be duly explained, for the ready and effective operation of the rake.

In the drawings, A represents the shafts of a rake, attached, at the rear ends, to a supporting transverse beam or stripper-bar B by bolts or screws, &c., extending through lugs *a* projecting horizontally from the rear of the vertical portion of curved arms C, the bottoms of which turn on pivots supported in bifurcated ends of plates D, attached to a transverse beam or head, E, through which extend transversely, and are held by screw-nuts, the ends of curved bearings F, notched on one side, and formed with horizontal projecting stems *f* on the opposite side, to receive spiral or other hold-down springs G. One end of each spring, G, is securely held against the front of the head E, and the other end is bent and formed so as to hook over the top of the curved teeth I, whose top ends are bent on one side laterally at right angles, so as to be inserted and held in lateral sockets formed in the stems *f*. Near the rear end of and connecting the shafts A, forward of the head E, is a transverse foot-board, H, to which is properly secured, at or near the center, an inclined standard, J, supporting a seat, K. The bottom of the standard J abuts against a forward flange of a chair, K', which is of a triangular or any other suitable shape, and has projecting laterally at the bottom a box, L, open on the top, and partially open at the front and rear to form side bearings *c*, which support and allow the turning of an axle, *d*, connected with the bottom of a peculiarly-constructed treadle and stirrup-lever, M, and having on each side, or otherwise suitably arranged, a spiral or other spring or springs, *e e'*, one end of the spring being attached to the axle *d*, and the other end impinging against the bottom of the box L. The lever M is curved on the front, and, extending rearward, is bifurcated to receive and allow the play of a longitudinal horizontal lever, N, one end of which lever N turns on a pivot supported in the bearings formed by the bifurcated portions or arms $g$ $g'$. The inner arm $g$ is curved so as to project upward and forward, and is provided at the top with a foot-rest, $h$, projecting at a right angle with its inner side, which foot-rest $h$ is to be used when the operator desires to dump the rake by means of his foot, or to raise the teeth in order to back the rake, or for other purposes. The outer arm $g'$ extends rearward, and is slightly curved downward at the end, where it is provided with a stem, $i$, that projects at a right angle from its outer side and supports, so as to allow the turning of lugs $i'$ depending from the rearward portion of a stirrup, P, which is curved or otherwise properly shaped at front and rear to receive the driver's right foot, and to have at the front a fulcrum on a cross-bar, $k$, attached to the foot-board H. A pin, $j$, projects from the outer side of the arm $g'$, to prevent the passage of the stirrup P beyond its desired position when the rake is dumped. The rear end of the lever N turns on a pivot connected with a slotted curved standard, Q, attached to and projecting rearward from the head E over and beyond the top of the stripper-bar B, which is provided with suitable strippers $l$. Bolted or otherwise secured to one end of the head E and bar B, at one side and bottom, are right-angled plates E' B', projecting laterally from segmental shields S S', open on front or outer side and top. The shield S is formed with an inner nave, $s$, that receives an axle, $m$, attached to the plate E', or is otherwise connected with the head E, which is located forward of the center of the rake-wheel T, which turns on the axle $m$. Projecting upward from, and a little forward of the top of the periphery of, the nave $s$ is a plate, $t$, inclined backward at the top to form a ledge, $t'$, that receives and directs the travel of a roller, $u$, turning on a stem, $v'$, projecting inward at a right angle with the top of a curved arm, $v$, pivoted at the bottom to the top of the shield S', and at the lower portion, on the outside, formed with a pawl, $w$, arranged to engage with or disengage from a ratchet-wheel, $x$, that receives a ratchet-wheel, $z$, connected with the interior hub of the rake-wheel T, and which ratchet-wheel $x$ is recessed on the interior periphery of its rim to receive and allow the operation of a spring-pawl, $x'$, that is pivoted to it and engages with the ratchet-wheel $z$, so as to hold and prevent the turning of the ratchet-wheel $x$ on the hub when the rake is dumped by the horse, or is released from to allow the rotation of the ratchet-wheel $x$ on the hub when the rake is dumped by the operator, or raised for backing or other purposes. Projecting outward laterally from the inside of the forward part of the shield S is a curved inclined plane or segmental flange, $y$, beveled downward on the top, between which and the top edge of the shield S is a space for the admission of the roller $u$, which is made to travel down on the inside and up on the outside of the segmental flange $y$ by the action of the head E, and thrown in gear by its own weight, aided by the flange $y$ and the action of the head E, and thrown out of gear by a stop, $s'$, on shield S, the pawl $w$ being notched or otherwise formed at the bottom to bear against the top edge of the face of the shield S', which is notched down to receive it and allow of its action. At each end of the foot-board H, at a proper distance from each other within the shafts A, are trace-hooks $n$, arranged to extend through and turn in the foot-board H, and connect at the bottom with an arm, $n'$, that connects with so as to hold and carry the end of a transverse draft-bar, U. Each trace-hook $n$ and arm $n'$ turns on a common center, and describes in turning an arc of a quarter of a circle or less in an opposite direction with each other, so as to produce a lateral and forward-and-back alternate movement to the draft-bar U, that allows the action of the traces to correspond to that of the horse's shoulders. The trace-hooks $n$ and arms $n'$ are secured one to the other, and the arms $n'$ are securely held to the draft-bar U by screw-nuts $z''$ $y''$, or may be otherwise securely connected with each other and arranged to support the bar U, which is thus held at both ends instead of in the center, as in the common whiffletree, so that in case of accident the draft-bar U, and consequently the horse, will not be freed from the vehicle; and by the above arrangement, when the trace-hooks $n$ have been brought forward to a certain point, a dead hitch occurs, the amount of motion desired being regulated by the length of the distance of the hook $n$ from the common center and the length of the arm $n'$.

The operation of our improved horse-rake is as follows: The rake, being propelled, collects the hay or grass, &c., which, at the proper time, is dumped by pressure of the driver's right foot on the forward part of the stirrup P, which serves as a lever, and, bearing on the fulcrum $k$, raises the rear end of the lever M and the forward end of the horizontal lever N, which releases the head E from its working position, when the motion of the head E, produced by the recoil of the teeth I and hold-down springs G, and the resistance of the hay, grass, &c., to the draft of the horse, carries the roller $u$ down the ledge $t'$ and under the segmental flange $y$, which guide and press the pawl $w$ into the ratchet-wheel $x$, which, being securely attached to the hub of the rake-wheel T by means of the spring-pawl $x'$ operating in ratchet-wheel $z$, presses against the pawl $w$, and carries the head E over with the rake-wheel T until the pawl $w$ strikes against the stop $s'$ of the shield S, which throws the pawl $w$ out of gear with the ratchet-wheel $x$, when the pawl $w$, by its own weight, drops downward and forward, so as to be completely clear from the ratchet-wheel $x$. The rake now being raised, and the hay, grass, &c., dumped, the spiral or other spring or springs $e$ $e'$ act on the treadle-lever M and horizontal lever N, and carry the head E back toward its former working position. In its backward motion the pawl $w$ is held downward and outward by its own weight and the centrifugal force given by the turning-head E until it is carried partly back to its original working position, when the roller $u$ falls by the weight of the pawl $w$ upon the outside of the segmental flange $y$. Pressure of the foot upon the stirrup P now bears down the lever M and the horizontal lever N till they make nearly a direct line, and holds the rake again in a working position; in the meantime the roller $u$ has been carried backward by the motion of the head E, resulting from said pressure of the foot, so that it drops, by the weight of the pawl $w$, upon the ledge $t'$. The ratchet-wheel $x$ is prevented from revolving backward on the hub of the wheel T, when the hay, &c., is dumped by the horse by means of the inner ratchet-wheel $z$ and spring-pawl $x'$, but is free to revolve forward on the hub when the rake is dumped by the driver, or when it is raised for backing or other purposes by the pressure of the driver's left foot upon the foot-rest $h$. In operating the rake the driver's right foot remains permanently on the stirrup P, so that, should the power of the wheel be insufficient to fully dump the rake, he may greatly assist and effect the operation by pressing forward on the stirrup when the rake-teeth have been partially raised. Moreover, when the windrows are very large the springs $e$ $e'$ will throw the rake back quickly, so that the teeth are apt to catch in the windrows and drag along the hay already raked. This objection is obviated by a slight pressure of the right foot upon the stirrup P when the teeth are raised, just enough pressure being exerted to overcome the power of the springs $e$ $e'$. In this way, also, the teeth may be kept raised when the driver wishes to drive across the field without raking, or on the road, the teeth being thus easily held. The driver's left foot usually rests on the foot-board H; but when he wishes to dump the rake he presses with the left foot on the foot-rest $h$ until the teeth are partly raised, when pressure on stirrup P operates as above described. When raking the driver presses slightly on stirrup P all the time, to keep levers M and N in nearly a direct line, when they firmly hold the rake in working position. By pressing with the toe on the forward part of the stirrup it bears on the fulcrum $k$ of the foot-board, and raises the levers M and N from a direct line, and frees the head E to move as it may. A very slight pressure of the right foot will either hold the rake firmly in working position or release it to be moved as desired.

By forming one end of the springs G in the form of a hook, so as to bend over and hold the top of the teeth I, which are bent laterally on one side so as to be inserted and held in the socket of the stems $f$, the teeth are securely held when inserted, and may be readily removed from the stems by applying a wrench or key, V, formed at one end with curved jaws, one arm of which fits over and has a bearing on the front periphery of the stem $f$, the other arm of the jaw having a tooth or lip arranged to bear against the bottom of the hooked end of the spring G, so that, by pressing on the handle of the wrench V, the jaw, bearing upon the stem $f$ as a fulcrum, lifts the hooked end of the spring G from the tooth, which is then readily released; or the hooked ends may be raised, so as to allow the release of the teeth, by any other device that may be preferred. When the teeth are inserted the hooked end is readily bent over them. The springs G allow the teeth I to turn partially in the stems or sockets $f$, thus permitting them to yield to fixed obstructions on the surface of the ground, but returning them instantly to place when the obstruction is passed.

It will readily be seen that, by the arrangement of the revolving or movable trace-hooks $n$, having a crank-motion and connected with each end of the draft-bar U by the levers or arms $n'$ moving on a common center with the said hooks, the draft-bar U is held and operated in the desired manner at both ends, instead of being held and turned at one central point, as in a common whiffletree, and is, therefore, much more secure and durable, and prevents the occurrence of any accident heretofore liable to happen by the breakage or disconnection of the whiffletree, as ordinarily applied to a vehicle, while the firm or dead hitch given on either side to the hooks when brought completely forward is very useful in steadying the rake or other vehicle when the wheels strike obstructions, especially when the wheels are far apart, as in a horse-rake.

We are aware that in the operation of the draft-bar the same effect may be obtained by many other devices, having experimented on several ourselves, and adopted the present arrangement of the revolving crank trace-hooks as preferable for the purposes desired.

Having thus fully described our improvements, what we claim as our invention, and desire to have secured to us by Letters Patent, is—

1. The lever M, provided with the curved arms $g$ $g'$, foot-rest $h$, and stirrup P, pivoted to lugs on the foot-board H, and having lifting-springs $e$ $e'$, in combination with the connecting-lever N and slotted arm Q of the rake-head, all adapted to hold the rake in operative position, and also release the same and throw it forward into position to engage the dumping mechanism, substantially as described.

2. The shields S S', connected with one end of the head and stripper-bar of a horse-rake, and formed with an inner nave, $s$, inclined ledge $t'$, stop $s'$, and inclined plane or segmental flange $y$, substantially as described, for the purpose specified.

3. The weighted pawl $w$, provided with the roller $n$, in combination with ratchet $x$ and flange $y$, all arranged and operating substantially as described.

4. The ratchet-wheel $x$, adapted to receive and be released from the pawl $w$, and provided with a spring-pawl, $x'$, so arranged as to engage with the ratchet-wheel $z$ on the wheel-hub, and prevent the backward turning of the ratchet-wheel $x$ when dumping the rake by the horse, and to allow the same to revolve when the rake is dumped by the driver, or raised for backing or other purposes, substantially as described.

5. The spring-bearings F, bolted to the rake-head and provided with stems $f$, adapted to secure the bent ends of the teeth I, in combination with springs G, the latter being clamped to the rake-head and hooked around the teeth in such manner as to allow the teeth to turn slightly in the stems, substantially as described, for the purpose specified.

In testimony whereof we have signed our names to this specification in the presence of two subscribing witnesses.

CHAS. M. LUFKIN.
CHAS. G. ALLEN.

Witnesses:
HENRY J. SHATTUCK,
A. G. WHEELOCK.